United States Patent
Flynn et al.

(10) Patent No.: US 8,369,312 B2
(45) Date of Patent: Feb. 5, 2013

(54) METHOD AND SYSTEM FOR RETRIEVING LOG MESSAGES FROM CUSTOMER PREMISE EQUIPMENT

(75) Inventors: James Flynn, Stoughton, MA (US); Lee Goodman, Tyngsboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1177 days.

(21) Appl. No.: 11/866,798

(22) Filed: Oct. 3, 2007

(65) Prior Publication Data
US 2009/0092126 A1    Apr. 9, 2009

(51) Int. Cl.
*H04L 12/66* (2006.01)

(52) U.S. Cl. .................................. 370/352; 370/241

(58) Field of Classification Search .................. 370/352, 370/241; 714/57; 455/454
See application file for complete search history.

(56) References Cited

U.S. PATENT DOCUMENTS

| | | | |
|---|---|---|---|
| 7,440,467 B2 * | 10/2008 | Gallatin et al. | 370/401 |
| 2005/0097199 A1 * | 5/2005 | Woodard et al. | 709/223 |
| 2007/0283194 A1 * | 12/2007 | Villella et al. | 714/57 |
| 2007/0291757 A1 * | 12/2007 | Dobson et al. | 370/392 |
| 2008/0004035 A1 * | 1/2008 | Atkins et al. | 455/454 |

* cited by examiner

*Primary Examiner* — David Oveissi

(57) ABSTRACT

An approach is provided for retrieving a system log. Packets that are destined for a predetermined network address and network port are detected and captured. The packets represent a log file corresponding to a customer premise equipment (CPE) for troubleshooting. A data file is generated to contain the log file, wherein the packets are discarded, by at a firewall, before reaching the predetermined network address and network port.

21 Claims, 7 Drawing Sheets

METHOD AND SYSTEM FOR RETRIEVING LOG MESSAGES FROM CUSTOMER PREMISE EQUIPMENT

BACKGROUND INFORMATION

Undoubtedly, the Internet has revolutionized personal and business communication by providing a global medium with powerful services such as the World Wide Web, e-mail, and Voice over Internet Protocol (VoIP). The Internet is a conglomeration of numerous heterogeneous networks, which are linked through internetworking devices, without restriction on the systems that can be a part of this global network. Because of the unrestricted nature, network security issues have garnered significant attention, particularly by service providers that need to ensure timely and secure communications for their customers. For example, in offering telecommunication services, service providers are continually faced with the challenge of balancing efficiency and cost versus security concerns. One important area involves the maintenance of customer premise equipment (CPE) devices configured to support services such as Internet access and VoIP. Conventionally, the retrieval of status information and alerts about a particular CPE device over the Internet can compromise the receiving system as well as the confidentiality of the information. Furthermore, the service providers need to be mindful of the protocols involved in such a service, as non-conformance to standards can result in a failed service.

Therefore, there is a need for securely obtaining information from CPE devices, while ensuring operations with current and developing standards.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF PREFERRED EMBODIMENTS

An apparatus, method, and software for providing secure retrieval of system log information are described. In the following description, for the purposes of explanation, numerous specific details are set forth in order to provide a thorough understanding of the various exemplary embodiments. It is apparent, however, that the various exemplary embodiments may be practiced without these specific details or with an equivalent arrangement. In other instances, well-known structures and devices are shown in block diagram form in order to avoid unnecessarily obscuring the exemplary embodiments.

Figure 1:
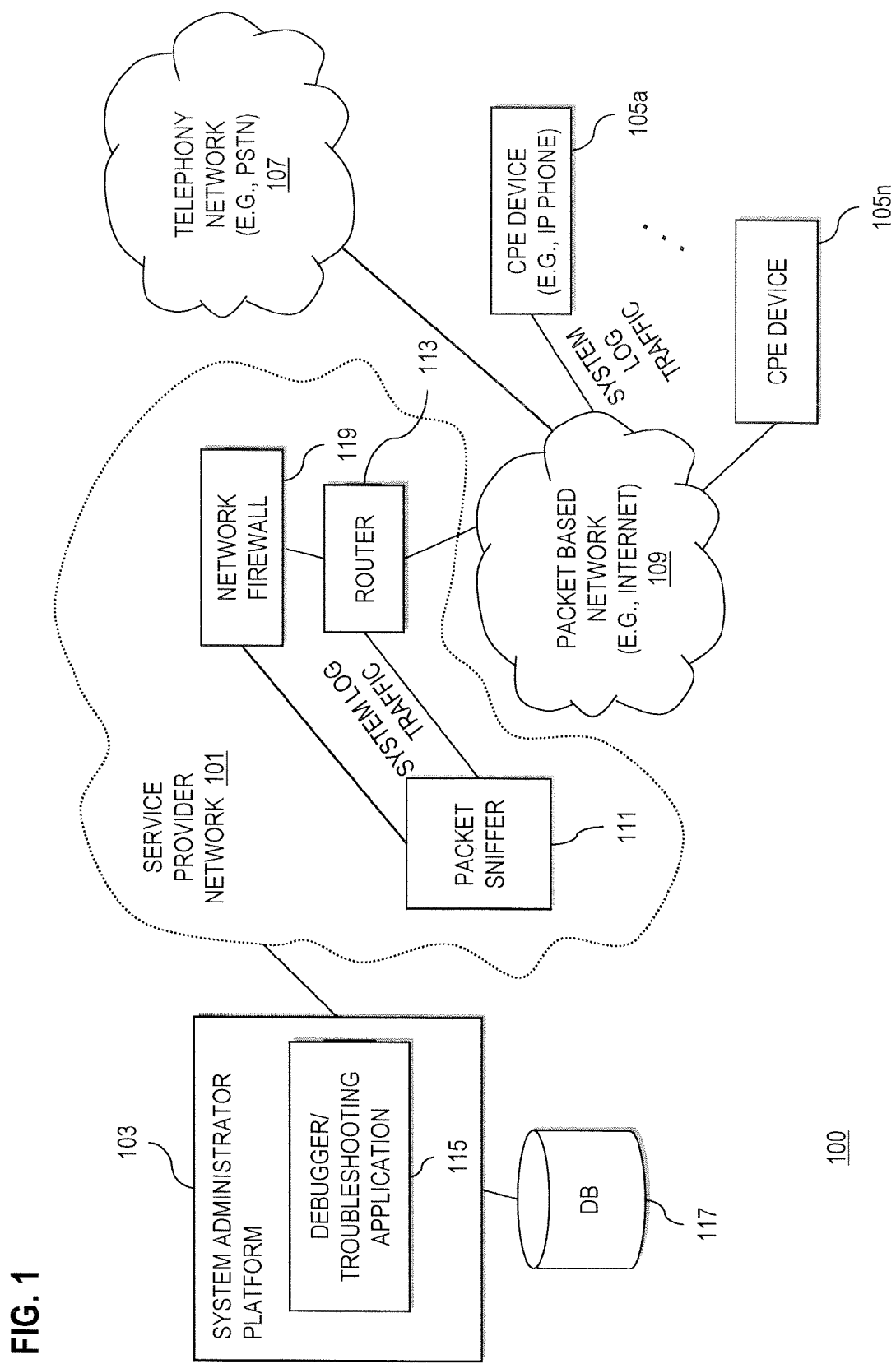
FIG. 1 is a diagram of a system capable of securely retrieving system log information via a packet sniffer, according with an exemplary embodiment.

FIG. 1 is a diagram of a system capable of securely retrieving system log information via a packet sniffer, according with an exemplary embodiment. By way of example, a communication system 100 includes a service provider network 101 that utilizes a system administrator platform 103 to manage customer premise equipment (CPE) devices 105a-105n. Such devices 105a-105n can include an Internet Protocol (IP) station or phone. Alternatively, one or more of the CPE devices 105a-105n can be an IP phone adapter that permits a standard DTMF (dual-tone multi-frequency) phone (not shown) to use Voice over IP (VoIP) without requiring a computer. The IP phone adapter couples to a telephony network 107, such as a Public Switched Telephone Network (PSTN) over a packet based network 109. The PSTN 107 includes a LEC (Local Exchange Carrier) or CLEC (Competitive Local Exchange Carrier) switch (not shown) that terminates the call to a called station. As part of the telecommunication services, a service provider needs to ensure proper operation of the CPE devices 105a-105n.

Because the PSTN 107 is connected to the Internet 109, communication among voice stations (e.g., IP phone 105a) that are serviced through the PSTN 107, and personal computers (not shown) that are attached to the Internet 109 can be established (e.g., VoIP). A telephony gateway (not shown) within the network 109 converts the packetized voice information into a POTS (Plain Old Telephone Service) electrical signal, which is circuit switched to a voice station served by the PSTN 107. In an exemplary embodiment, the CPE device 105a employs Session Initiation Protocol (SIP) to exchange messages. A detailed discussion of SIP and its call control services are described in IETF RFC 2543 and IETF Internet draft "SIP Call Control Services", Jun. 17, 1999; both of these documents are incorporated herein by reference in their entireties.

By way of example, in an enterprise scenario, the CPE devices 105a-105n are a bank of IP phones behind an IP private branch exchange (IP PBX). Unlike traditional circuit-switched PBX troubleshooting, in which phones are connected to physical ports so that narrowing problem areas is a relatively straightforward task, IP telephony involves a multitude of network elements working in concert (e.g., the IP phone itself, the various gateways, as well as the numerous routers transporting the traffic). The telephone connections are virtual, and thus, introduce more complexity in the troubleshooting process. Timely and accurate troubleshooting of the CPE devices 105a-105n, thus, plays a vital role in ensuring users are satisfied with their communication service.

Traditionally, obtaining information (e.g., system log information) from CPE devices 105a-105n to assist with debugging or troubleshooting, without compromising network security, has been difficult, largely because of the network address translation (NAT) aspect of the connections. NAT provides Internet connection sharing by permitting an Internet Protocol (IP) network to maintain public IP addresses separately from private IP addresses. In other words, NAT maps all of the private IP addresses to a single globally recognized IP address. NAT operates by modifying the source or destination address in the IP header to reflect the configured address mapping. The NAT protocol is more fully described in RFC 1631, which is incorporated herein by reference in its entirety.

According to certain embodiments, the system 100 provides an approach for retrieving system log messages from the CPE devices 105a-105n, in a manner that protects the privacy and confidentiality of the customer's system log messages without exposing network systems or infrastructure. This approach ensures the integrity of the system administrator platform 203 that receives these messages, and protects the network elements of the network 101 from potential attack. This allows safe and secure delivery of system log messages without being vulnerable to a hostile host located on the data network 109.

In one embodiment, a generic packet sniffer 111 is provided to capture system log information from the CPE devices 105a-105n. The packet sniffer 111 serves as a network analyzer or protocol analyzer for various types of network traffic, and can be implemented in software and/or hardware; details of an exemplary packet sniffer 111 is explained with respect to FIG. 5. Essentially, packets containing the system log messages are carried over a router 113 that directs the traffic towards a destination node, e.g., the system administrator platform 103. The packet sniffer 111 captures the traffic. Thereafter, the system administrator system 103 can process the system log traffic using a debugger/troubleshooting application 115 to analyze the system log information. The resultant analysis can be stored in a database 117. The database 117 can also serve as a central data repository for the storage of logs for multiple customer premise equipment corresponding to one or more subscribers.

The service provider network 101 includes a network firewall 119 that filters out the system log message before reaching the platform 103. The system administrator platform 103, in one embodiment, is a network management system.

Figure 2:
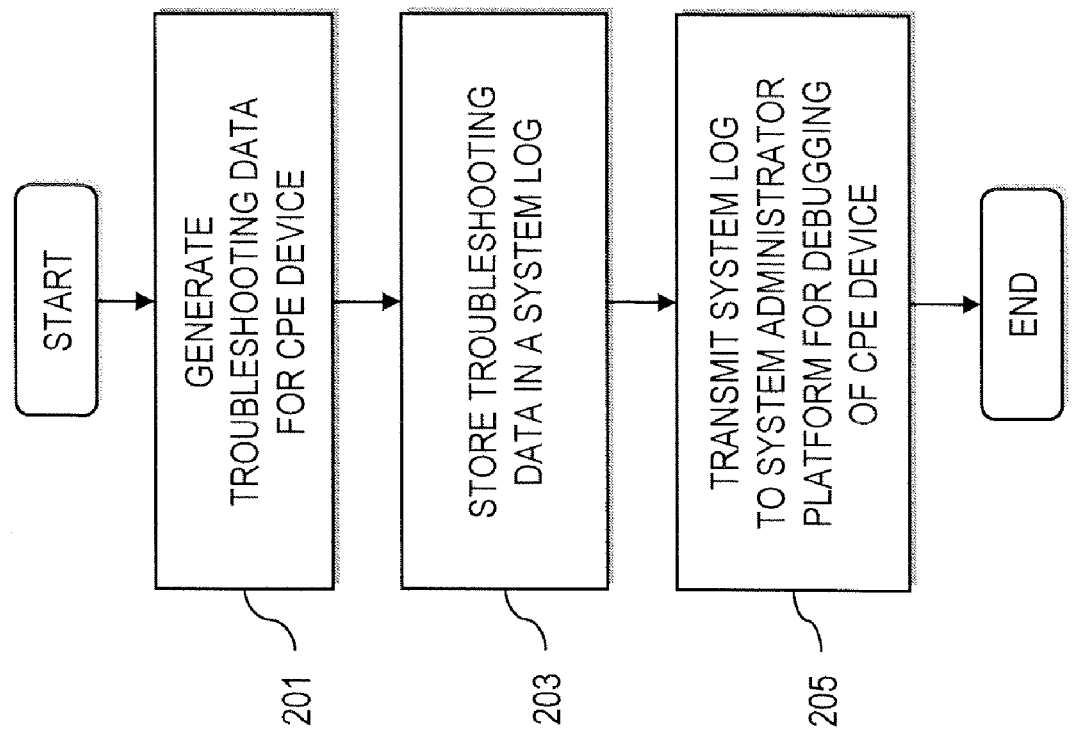
FIG. 2 is a flowchart of a process for obtaining system log information from a customer premise equipment (CPE) device, according to an exemplary embodiment.

FIG. 2 is a flowchart of a process for obtaining system log information from a customer premise equipment (CPE) device, according to an exemplary embodiment. For the purposes of illustration, it is assumed that the CPE device 105a has been experiencing operational problems. Accordingly, data is generated, as in step 201, by the CPE device 105a for troubleshooting the device 105a. In one embodiment, the troubleshooting data is stored as a system log, per step 203. The CPE device 105a can subsequently transmit the system log to the system administrator platform 103 for debugging and/or troubleshooting of the subject device 105a (step 205).

As mentioned, the direct transmission of the system log by the CPE device 105a to the platform 103 poses a security risk for the service provider network 101. In recognition of this problem, the system 100 employs a packet sniffer 111, as next described.

Figure 3:
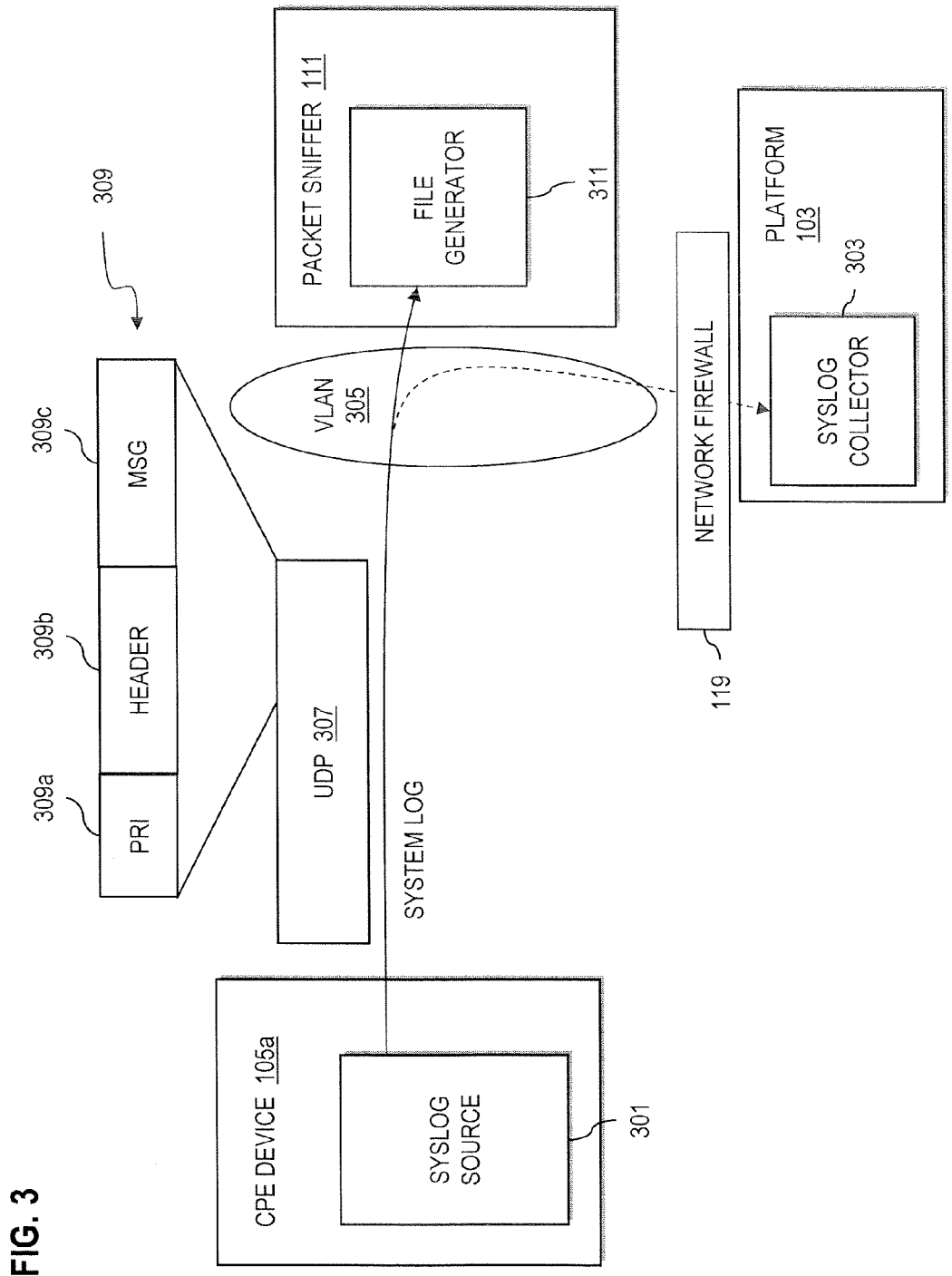
FIG. 3 is a diagram of a packet sniffer configured to acquire a system log information, according to an exemplary embodiment.

FIG. 3 is a diagram of a packet sniffer configured to acquire system log information, according to an exemplary embodiment. As mentioned, troubleshooting issues with remote CPE devices is difficult. Namely, the NAT aspect of the network connections involved with secure transport of the system log information increases the degree of difficulty. By way of example, troubleshooting and/or debugging data are represented in system log messages according to the syslog protocol. This protocol is more fully described in Internet Engineering Task Force (IETF) Request for Comment (RFC) 3164, which is incorporated herein by reference in its entirety.

Having a location to send syslog and debug logs is vital to the troubleshooting process. Under this scenario, the CPE device 105a behaves as a syslog source 301, and the platform 103 serves as a syslog collector 303. The syslog protocol provides an approach by which system messages are formatted and sent to remote systems for centralized archive/logging purposes (e.g., database 117). The syslog protocol uses a user datagram protocol (UDP) as the underlying transport layer mechanism; e.g., the UDP port that has been assigned to syslog is 514. The syslog protocol does not provide acknowledgement of message delivery. In this manner, senders transmit messages to receivers with no knowledge of whether they are acting for originators, collectors or relays.

It is noted that use of an actual server on the Internet 109 and allowing UDP traffic using port 514 from any device on the Internet 109 would be a breach of security protocols. Because of this drawback, service providers generally do not enable capture of system log events on a regular basis. This limits the amount of information that can be utilized in support of troubleshooting customers' issues relating to the CPE devices 105a-105n. Consequently, such limitation lengthens the troubleshooting process, and thus, the potential outage intervals experienced by the customers.

In one embodiment, the packet sniffer 111 is located on a protected virtual local area network (VLAN) behind the network firewall 119 to capture UDP packets destined to an IP address (e.g., the IP address of the platform 103). Specifically, the packet sniffer 111 can be configured to capture all packets destined for that protected IP address and UDP port 514.

As shown, a UPD packet 307 contains a syslog message 309 that specifies troubleshooting data generated by the CPE device 105a. The syslog message 309 includes a PRI part 309a, a HEADER part 309b, and a MSG part 309c. Generally, the length of the syslog message 309 is 1024 bytes or less. The PRI part 309a includes a number denoted as a "Priority value." This priority value represents both the Facility and Severity. These parameters are detailed in RFC 3164. For example, Table 1 lists the syslog message severities.

TABLE 1

| Numerical Code | Severity |
|---|---|
| 0 | Emergency: system is unusable |
| 1 | Alert: action must be taken immediately |
| 2 | Critical: critical conditions |
| 3 | Error: error conditions |
| 4 | Warning: warning conditions |
| 5 | Notice: normal but significant condition |
| 6 | Informational: informational messages |
| 7 | Debug: debug-level messages |

The HEADER part 309b contains a timestamp and an indication of the hostname or IP address of the device. The MSG part 309c specifies the system log information within a CONTENT field, as well as the process that generated the system log information within a TAG field.

Figure 4:
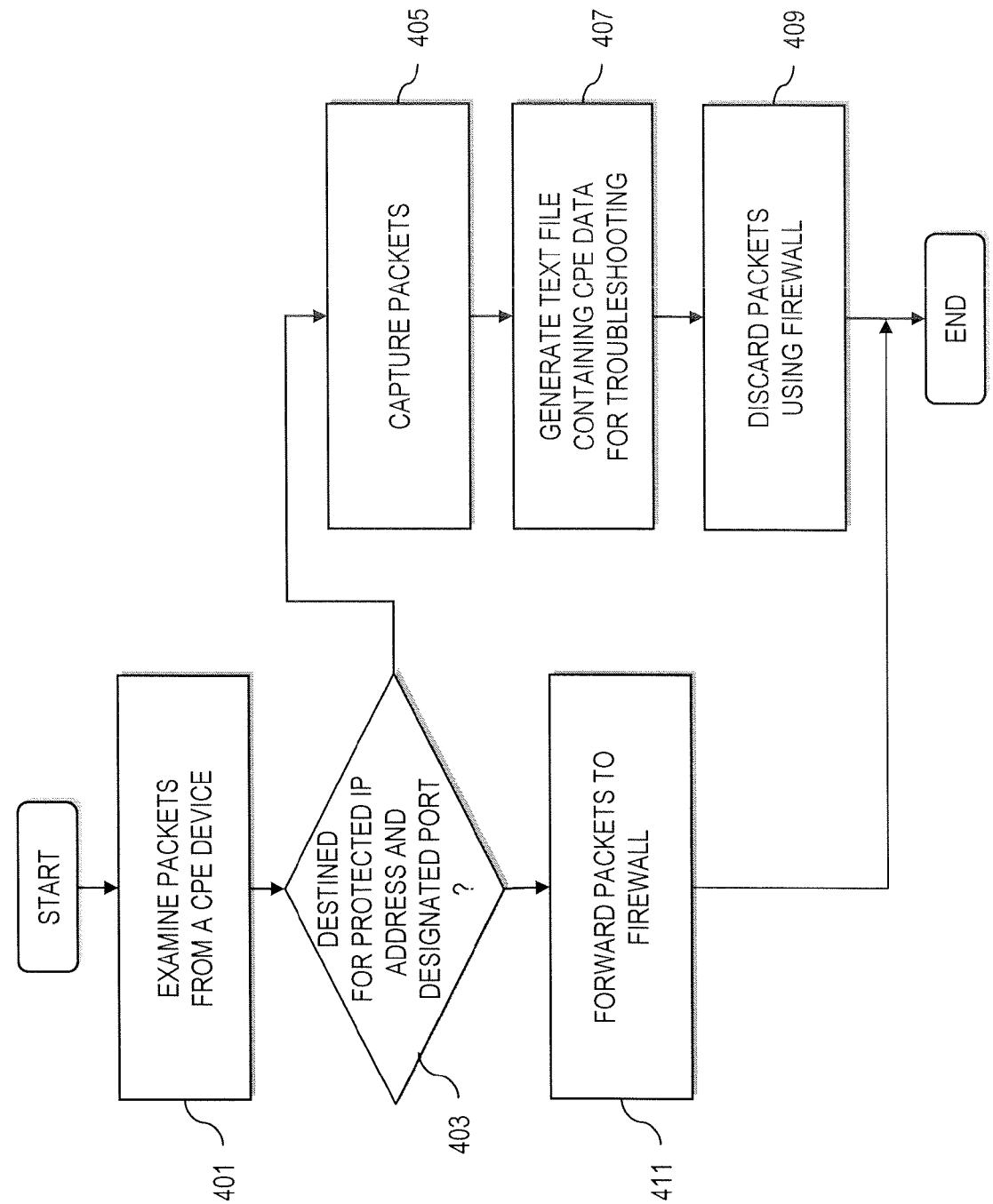
FIG. 4 is a flowchart of a process for generating a text file representing system log information, according to an exemplary embodiment.

The operation of the packet sniffer 111 is explained with respect to FIG. 4.

FIG. 4 is a flowchart of a process for generating a text file representing system log information, according to an exemplary embodiment. Using the system of FIG. 3, the packet capture is performed on the VLAN 305 or network segment before the network firewall 119. It is assumed that the CPE device 105a can generate, periodically or on-demand, system log information for troubleshooting the CPE device 105a. The generation can also be event based; e.g., the event can be an error condition.

In step 401, packets originating from the CPE device 105a are examined by a router (e.g., the router 113 of FIG. 1) to determine whether the packets are destined for a protected IP address and designated port—e.g., address of the platform 103 and UPD port 514 (step 403). If so, the packets are captured, as in step 405, over a designated link within the VLAN 305 by the packet sniffer 111.

According to one embodiment, the packets are output as text file by the packet sniffer 111 via a file generator 311 (step 407). The network firewall 119 can then discard, per step 409, these packets before they reach the destination—i.e., platform 103. The text file can then be supplied to the debugger/troubleshooting application 115 of the system administrator platform 103 for debugging or troubleshooting.

Returning to step 403, if the packets are not to be captured the packet sniffer 111, they are simply forwarded, as in step 411, to the firewall 119, which will filter the packets accordingly.

Under the above process, because the packets are not reassembled and only the contents are set for viewing only, there is no security threat to the service provider network 101. Also, there is no need to have a system listening on the unprotected Internet segment for syslog messages. Moreover, any system probing for active UDP port 514 services would not be able to detect the presence of this service within any network segment.

Although retrieval of the system log information is described using the syslog protocol, the above approach can be utilized for any stream (using any equivalent protocol) to log function.

Figure 5:
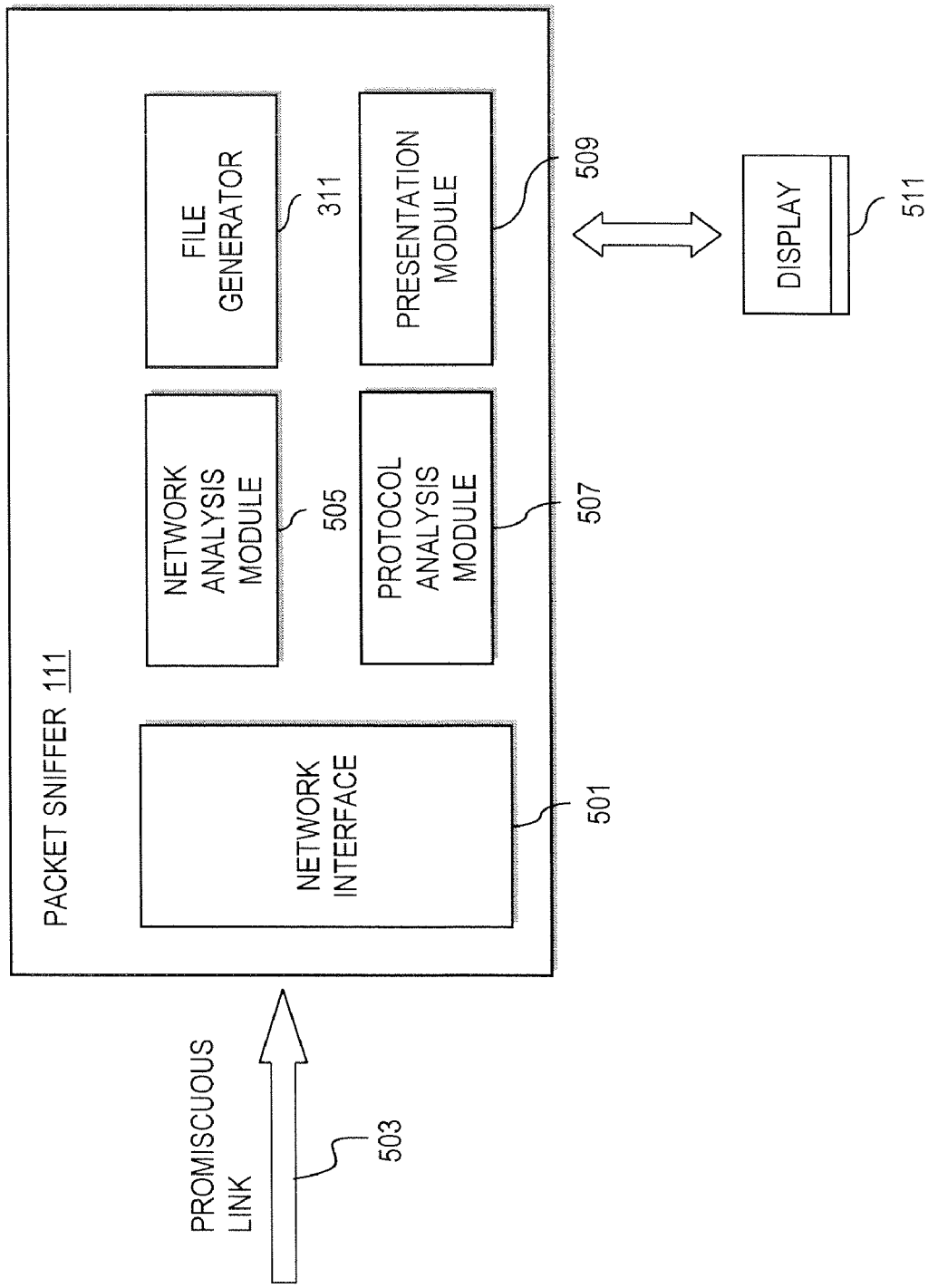
FIG. 5 is a diagram of exemplary components of a packet sniffer, according to an exemplary embodiment.

FIG. 5 is a diagram of exemplary components of a packet sniffer, according to an exemplary embodiment. As shown, the packet sniffer 111 includes a network interface 501 to listen for system log traffic over a "promiscuous" link 503. That is, the network interface 501 operates in a promiscuous mode, whereby all packets are read (as opposed to only those packets addressed to the device). A network analysis module 505 and a protocol analysis module 507 are provided. In one embodiment, the packet sniffer 111 is a dedicated passive device; alternatively, the sniffer can be deployed into an active network device. The network analysis module 505 and protocol analysis module 507 can passively monitor the packets on the link 503 via the network interface 501. The packets can, for example, be correlated to filter out duplicate packets and detect retransmissions.

The packet sniffer 111 can also include a presentation module 509 for presenting a graphical user interface (GUI) configured to display the system log information to a display 511. Alternatively, this GUI can be utilized by the system administrator system 103 to view the log information.

Figure 6:
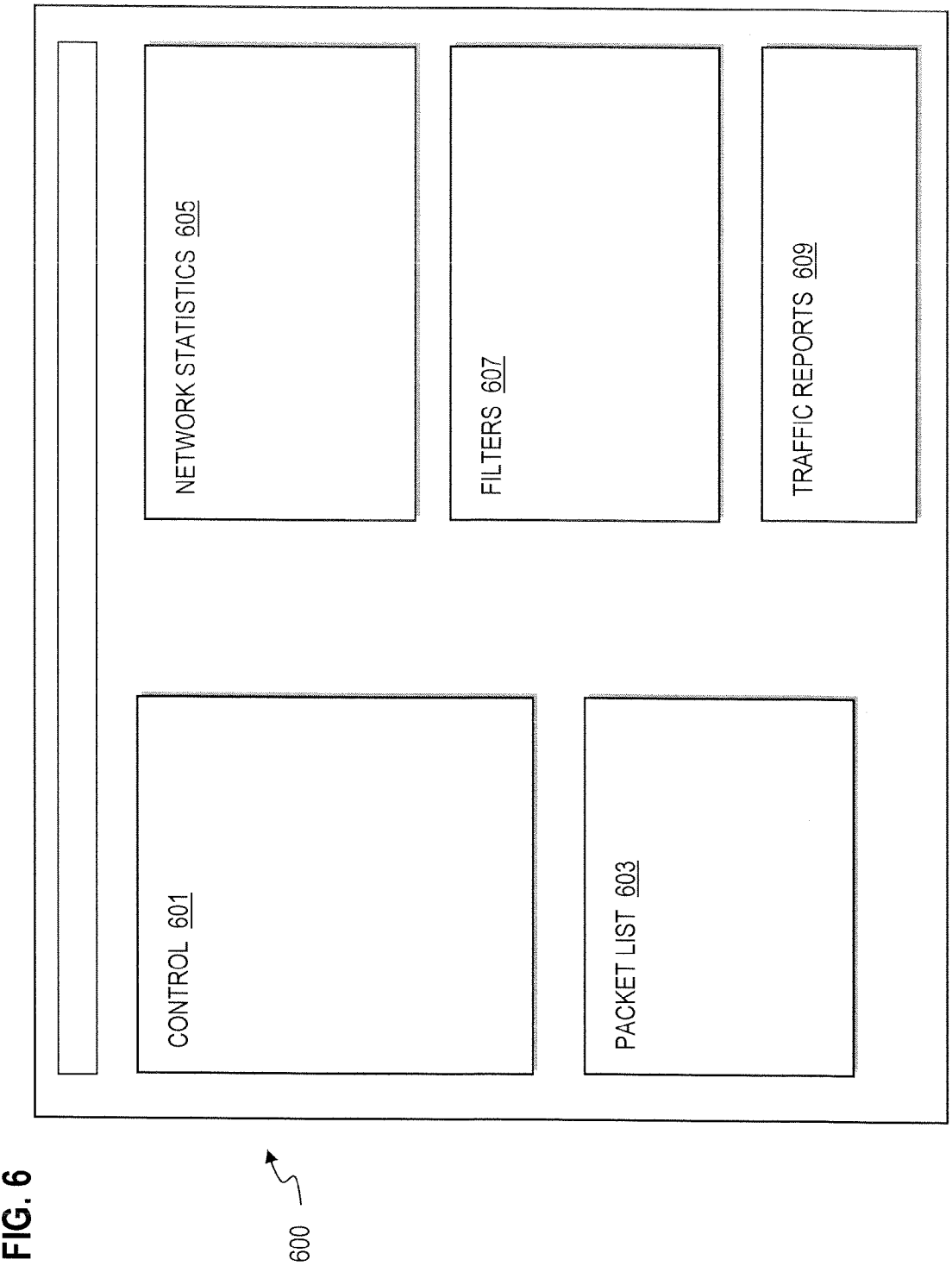
FIG. 6 is a diagram of an exemplary graphical user interface (GUI) for utilizing system log information, according to an exemplary embodiment.

FIG. 6 is a diagram of an exemplary graphical user interface (GUI) for utilizing system log information, according to an exemplary embodiment. A screen 600 provides viewing of the system log information, as well as report generation. The screen 600 may include one or more interactive panes 601-609. Pane 601 provides various control functions to specify the content of the screen 600. For example, the user can select a packet list pane 603, which enumerates all the packets that are being monitored; this view can be in hexadecimal as well as ASCII (American Standard Code for Information Interchange). The pane 603 permits the user to select a particular packet for modification and for saving.

Also, the user can activate a network statistics pane 605, which displays various statistical data for the received packets. In addition, a filters pane 607 is provided to apply filters associated with the system log information. These filters can include hardware filters and software filters. The filters, for instance, can include protocol types (e.g., physical layer, network layer, transport layer, etc.), transmission type (e.g., broadcast, multicast, unicast, etc.), traffic type (e.g., HyperText Transfer Protocol (HTTP) traffic and text), etc. Filters are particularly useful when the packet sniffer 111 is used to isolate packets for further analysis.

Furthermore, a pane 609 permits selection of various traffic reports or customization of reports.

Although not depicted, the screen 600 can additionally provide various navigational elements, e.g., scrollbars, tabs, etc. to allow users to traverse or navigate the screen 600.

The above described processes relating to system log information retrieval and associated CPE troubleshooting may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
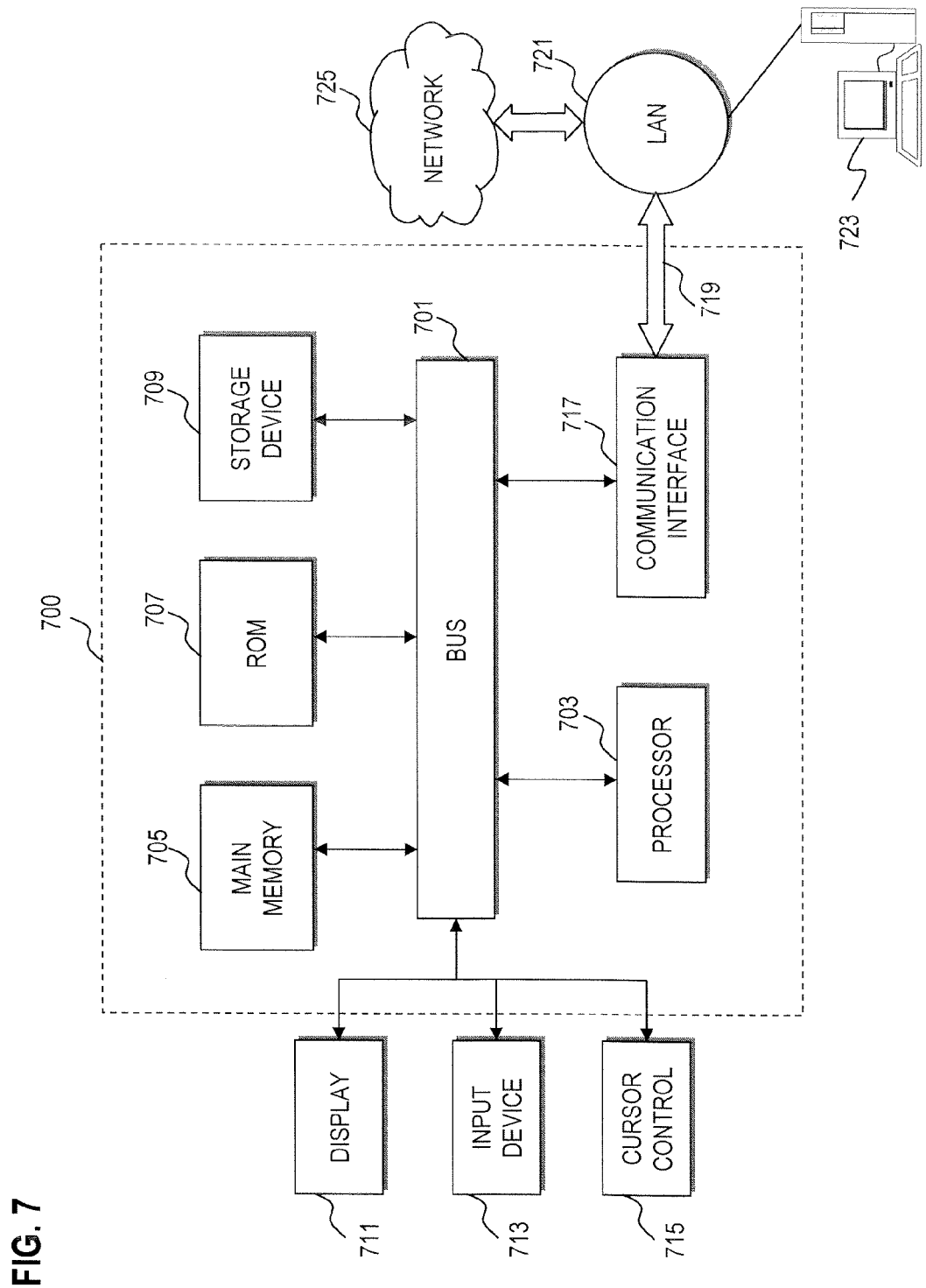
FIG. 7 is a diagram of a computer system that can be used to implement various exemplary embodiments.

FIG. 7 illustrates a computer system 700 upon which an exemplary embodiment can be implemented. For example, the processes described herein can be implemented using the computer system 700. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the exemplary embodiment. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   detecting packets, by a packet sniffer, destined for a predetermined network address and network port of a network, wherein the packets include troubleshooting information generated by a customer premise equipment (CPE) device for troubleshooting the CPE device;
   capturing the packets, prior to reaching a destination platform associated with the predetermined network address and network port;
   generating, by the packet sniffer, a data file based on the captured packets, wherein the data file reflects the troubleshooting information;
   forwarding the data file to a system platform for the troubleshooting of the CPE device; and
   forwarding the packets for discarding by a firewall, before reaching the destination platform, to protect security of the network and the CPE device.

2. A method according to claim 1, wherein the packets are captured by a packet sniffer within a network segment before the firewall.

3. A method according to claim 2, wherein the network segment is a virtual local area network (VLAN).

4. A method according to claim 1, further comprising:
   debugging the troubleshooting information to perform the troubleshooting of the CPE device.

5. A method according to claim 1, wherein the packets comprise system log message packets and the troubleshooting information comprises system log information generated by the CPE device using a syslog protocol.

6. A method according to claim 1, wherein the CPE device comprises a voice over Internet Protocol (VoIP) station.

7. A method according to claim 1, further comprising:
   transmitting the data file to a central data repository configured to store logs for a plurality of CPE devices.

8. A method according to claim 1, wherein the packets are received over a public data network.

9. A packet sniffer apparatus comprising:
a processor configured to,
   detect packets destined for a predetermined network address and network port of a network, wherein the packets include troubleshooting information generated by a customer premise equipment (CPE) device for troubleshooting the CPE device,
   capture the packets, prior to reaching a destination platform associated with the predetermined network address and network port,
   generate a data file based on the captured packets, wherein the data file reflects the troubleshooting information,
   forward the data file to a system platform for the troubleshooting of the CPE device;
   forward the packets for discarding by a firewall, before reaching the destination platform, to protect security of the network and the CPE device.

10. An apparatus according to claim 9, wherein the the apparatus comprises a packet sniffer within a network segment before the firewall.

11. An apparatus according to claim 10, wherein the network segment is a virtual local area network (VLAN).

12. An apparatus according to claim 9, wherein the packets comprise system log message packets and the troubleshooting information comprises system log information generated by the CPE device using a syslog protocol.

13. An apparatus according to claim 9, wherein the CPE device comprises a voice over Internet Protocol (VoIP) station.

14. An apparatus according to claim 9, further comprising:
a communication interface configured to transmit the data file to a central data repository configured to store logs for a plurality of CPE devices.

15. An apparatus according to claim 9, wherein the packets are received over a public data network.

16. A system comprising:
a router configured to detect packets on a network destined for a predetermined network address and network port, wherein the packets include troubleshooting information generated by a customer premise equipment (CPE) device for troubleshooting the CPE device;
a packet sniffer configured to communicate with the router and to capture the packets, prior to reaching a destination platform associated with the predetermined network address and network port, wherein the packet sniffer is further configured to generate a data file based on the captured packets, wherein the data file reflects the troubleshooting information, to forward the data file to a system platform for the troubleshooting of the CPE device; and
a firewall configured to receive the packets, and to discard the packets, before reaching the destination platform, to protect security of the network and the CPE device,
wherein the packet sniffer is situated within a network segment before the firewall.

17. A system according to claim 16, wherein the network segment is a virtual local area network (VLAN).

18. A system according to claim 16, wherein the packets comprise system log message packets and the troubleshooting information comprises system log information generated by the CPE device using a syslog protocol.

19. A system according to claim 16, wherein the CPE device comprises a voice over Internet Protocol (VoIP) station.

20. A system according to claim 16, further comprising:
a central data repository configured to store logs for a plurality of CPE devices.

21. A system according to claim 16, wherein the packets are received over a public data network.

* * * * *